US012197159B2

(12) United States Patent
Tajiri

(10) Patent No.: US 12,197,159 B2
(45) **Date of Patent: *Jan. 14, 2025**

(54) IMAGE FORMING APPARATUS INCLUDING DRUM CARTRIDGE HAVING CHARGER AND PHOTOSENSITIVE DRUM

(71) Applicant: BROTHER KOGYO KABUSHIKI KAISHA, Nagoya (JP)

(72) Inventor: Fumitake Tajiri, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/932,731

(22) Filed: Sep. 16, 2022

(65) Prior Publication Data

US 2023/0013592 A1 Jan. 19, 2023

Related U.S. Application Data

(63) Continuation of application No. 17/116,022, filed on Dec. 9, 2020, now Pat. No. 11,467,522, which is a (Continued)

(30) Foreign Application Priority Data

Mar. 29, 2018 (JP) ................................ 2018-063386

(51) Int. Cl.
*G03G 15/02* (2006.01)
*G03G 15/00* (2006.01)

(52) U.S. Cl.
CPC ..... *G03G 15/5037* (2013.01); *G03G 15/0225* (2013.01); *G03G 15/0266* (2013.01)

(58) Field of Classification Search
CPC ........... G03G 15/0225; G03G 15/0266; G03G 15/5037
See application file for complete search history.

(56) References Cited

U.S. PATENT DOCUMENTS 6,205,298 B1 3/2001 Yamamoto
7,634,202 B2 12/2009 Kitazawa et al.
(Continued)

FOREIGN PATENT DOCUMENTS

JP 4-240661 A 8/1992
JP 2009-53422 A 3/2009
(Continued)

OTHER PUBLICATIONS

Office Action issued in corresponding Japanese Patent Application No. 2018-063386, mailed Feb. 1, 2022.

*Primary Examiner* — Hoang X Ngo
(74) *Attorney, Agent, or Firm* — Merchant & Gould P.C.

(57) ABSTRACT

An image forming apparatus includes a developing cartridge, a drum cartridge, a casing, a connector, and a controller. The drum cartridge includes a photosensitive drum, a drum cartridge memory, a charger, and a cleaner. The charger is configured to charge the photosensitive drum and including a wire and a grid electrode. The cleaner is configured to clean the wire. The connector is configured to be electrically connected to the drum cartridge memory. Information is writable to the drum memory through the connector. The detection circuit board is configured to detect a state of discharge of the charger. The controller is configured to perform: determining whether or not the state of discharge detected by the detection circuit board is abnormal; and writing, in the drum cartridge memory, information representing occurrence of the abnormal discharge through the connector in a case where occurrence of the abnormal discharge is determined.

8 Claims, 7 Drawing Sheets

Related U.S. Application Data continuation of application No. 16/363,134, filed on Mar. 25, 2019, now Pat. No. 10,866,552.

(56) References Cited

U.S. PATENT DOCUMENTS

| | | | | |
|---|---|---|---|---|
| 2009/0060535 | A1 | 3/2009 | Hamaya | |
| 2013/0108295 | A1 | 5/2013 | Kanehara et al. | |
| 2016/0139558 | A1 * | 5/2016 | Kawakami | G03G 21/1885 399/113 |
| 2017/0351192 | A1 | 12/2017 | Ikada et al. | |

FOREIGN PATENT DOCUMENTS

| | | | |
|---|---|---|---|
| JP | 2013-130637 | A | 7/2013 |
| JP | 2017-134207 | A | 8/2017 |
| JP | 2017-219832 | A | 12/2017 |

* cited by examiner

IMAGE FORMING APPARATUS INCLUDING DRUM CARTRIDGE HAVING CHARGER AND PHOTOSENSITIVE DRUM

CROSS REFERENCE TO RELATED APPLICATION

This application is a continuation of U.S. patent application Ser. No. 17/116,022, filed Dec. 9, 2020, now U.S. Pat. No. 11,467,522, which is a continuation of U.S. patent application Ser. No. 16/363,134, filed Mar. 25, 2019, now U.S. Pat. No. 10,866,552, which claims priority from Japanese Patent Application No. 2018-063386 filed Mar. 29, 2018. The entire content of the priority applications is incorporated herein by reference.

TECHNICAL FIELD

The present disclosure relates to an image forming apparatus.

BACKGROUND

An electro-photographic type image forming apparatus such as a laser printer and an LED printer is well known in the art. Such an image forming apparatus includes a memory storing information required to control the image forming apparatus.

There is conventionally known an image forming apparatus including a process cartridge which includes an integrated circuit (IC) card. When the process cartridge does not satisfy a predetermined condition for image formation, the image forming apparatus stores prohibition information in the IC card to prohibit use of the process cartridge. If the prohibition information is stored in the IC card when the image forming apparatus starts its operation, the image forming apparatus prohibits image formation by using the process cartridge based on the prohibition information.

There is further conventionally known an image forming apparatus that applies a voltage to a charge roller that is in contact with the surface of a photosensitive drum. Specifically, the image forming apparatus detects the amount of current being discharged between the charge roller and the photosensitive drum. Based on the amount of current detected, the image forming apparatus controls a bias voltage to be applied to the charge roller. The image forming apparatus stores, in a memory of the process cartridge, information required for determining the bias voltage.

SUMMARY

The above-described image forming apparatus including the process cartridge having the IC card prohibits image formation by the process cartridge based on the prohibition information stored in the IC card. The above-described image forming apparatus applying the voltage to the charge roller stores, in the memory, the information required for controlling the bias voltage to be applied to the charge roller. However, any of the image forming apparatuses described above are not directed to a system in which a charger including a wire and a grid electrode is provided to charge the photosensitive drum, and do not store, in the memory, information indicating that an abnormal discharge has occurred in the charger.

In view of foregoing, it is an object of the present disclosure to provide an image forming apparatus capable of storing, in a memory, information indicating that an abnormal discharge has occurred in a drum cartridge.

In order to attain the above and other objects, according to one aspect, the disclosure provides an image forming apparatus including a developing cartridge, a drum cartridge, a casing, a connector, and a controller. The developing cartridge includes a developing roller. The developing cartridge is attachable to and detachable from the drum cartridge. The drum cartridge includes a photosensitive drum, a drum cartridge memory, a charger, and a cleaner. The charger is configured to charge the photosensitive drum and including a wire and a grid electrode. The cleaner is configured to clean the wire. The drum cartridge attached with the developing cartridge is attachable to the casing. The connector is configured to be electrically connected to the drum cartridge memory in a state where the drum cartridge is attached to the casing. Information is writable to the drum memory through the connector. The detection circuit board is configured to detect a state of discharge of the charger. The controller is configured to control printing. The controller is configured to perform: determining whether or not the state of discharge detected by the detection circuit board is abnormal; and writing, in the drum cartridge memory, information representing occurrence of the abnormal discharge through the connector in a case where occurrence of the abnormal discharge is determined.

BRIEF DESCRIPTION OF THE DRAWINGS

The particular features and advantages of the disclosure will become apparent from the following description taken in connection with the accompanying drawings, in which.

DETAILED DESCRIPTION

Hereinafter, an image forming apparatus 100 according to one embodiment of the present disclosure will be described with reference to FIGS. 1 through 7.

1. Configuration of Image Forming Apparatus

Figure 1:
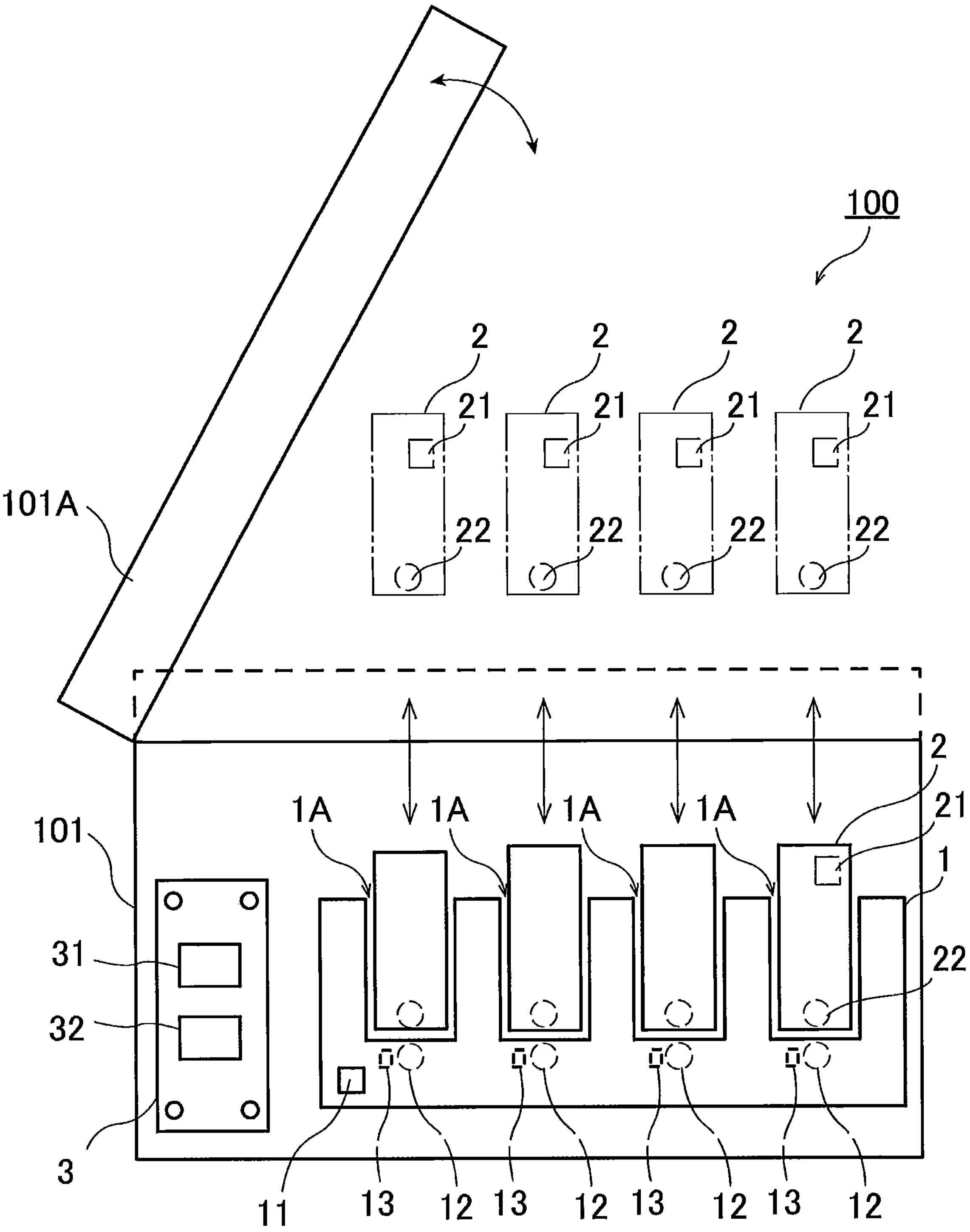
FIG. 1 is a conceptual diagram of an image forming apparatus according to one embodiment of the present disclosure.
Figure 2:
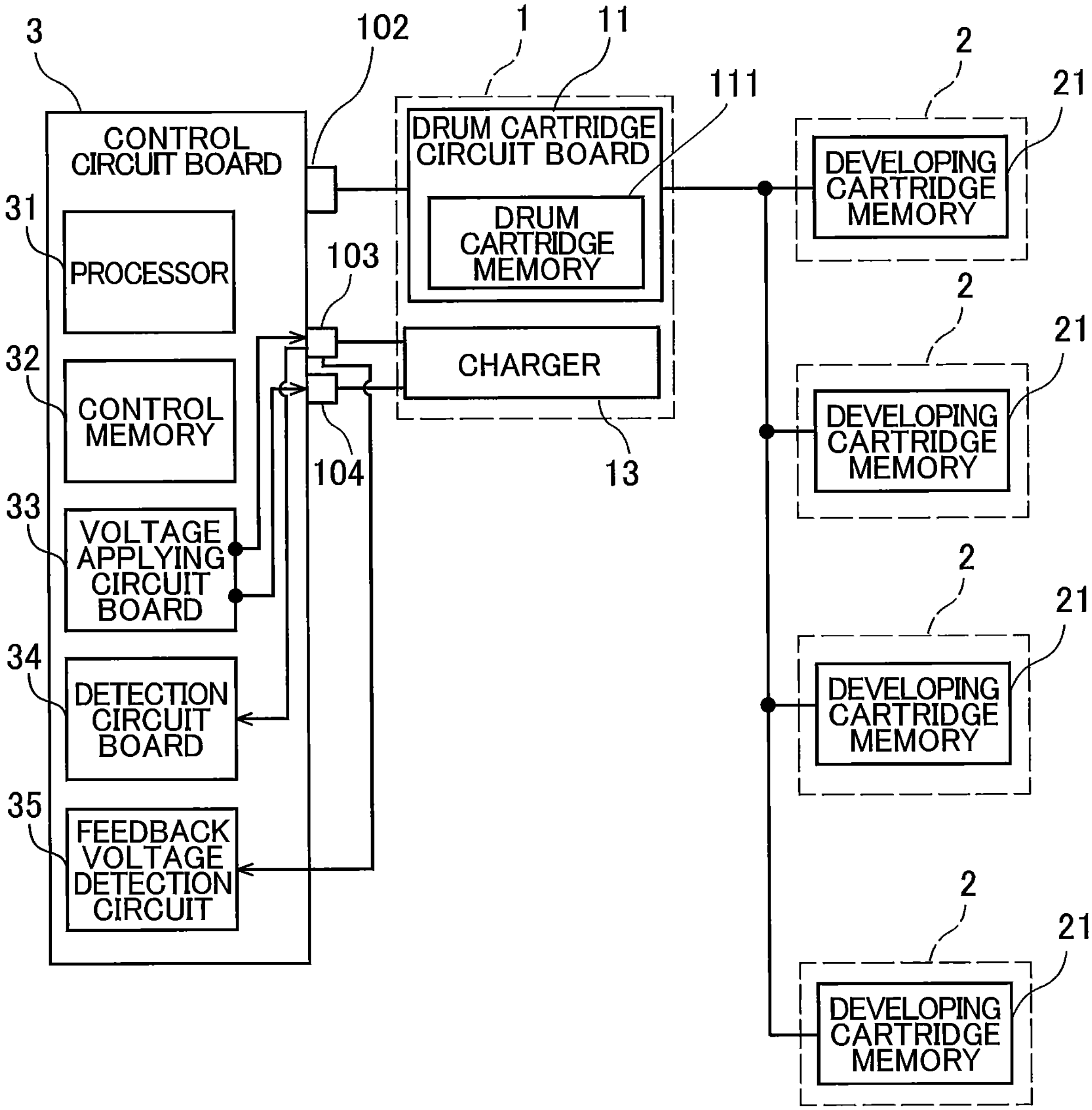
FIG. 2 is a block diagram illustrating an electrical connection between components in the image forming apparatus according to the embodiment.
Figure 3:
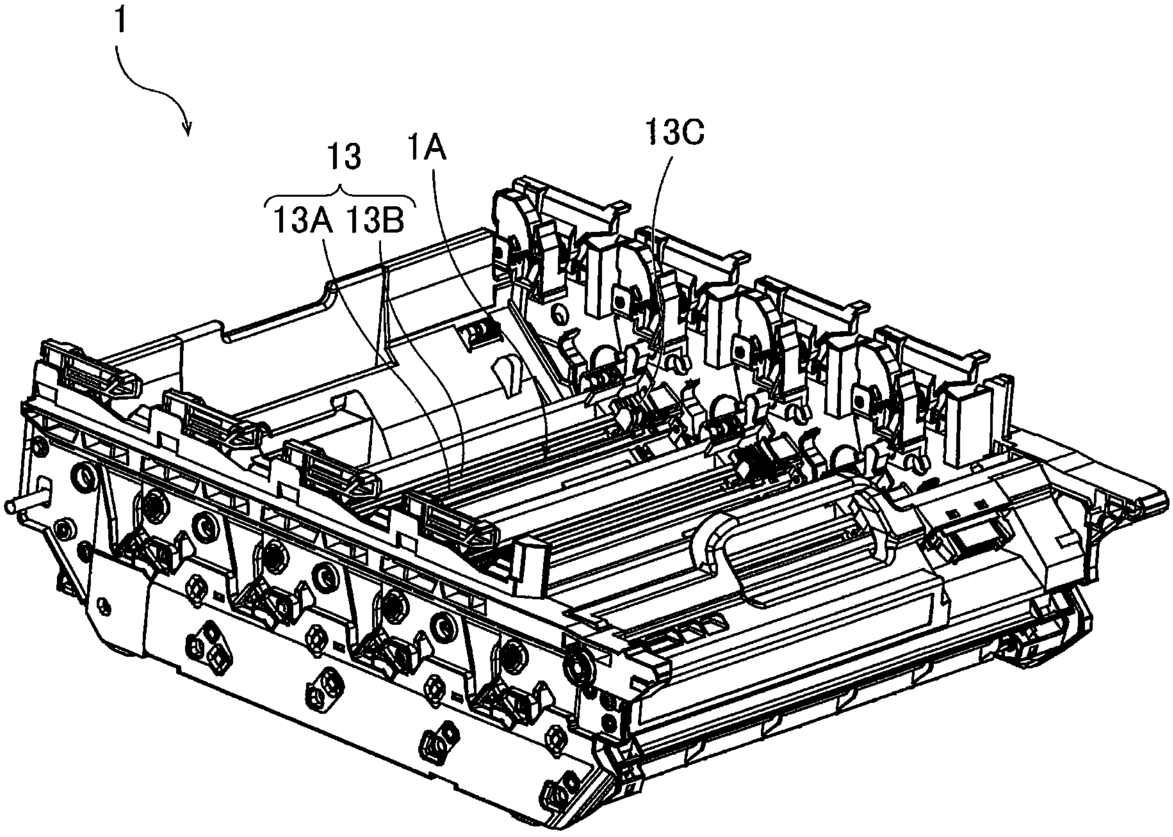
FIG. 3 is a perspective view of a drum cartridge of the image forming apparatus according to the embodiment.

FIG. 1 is a conceptual diagram of an image forming apparatus 100. FIG. 2 is a block diagram illustrating an electrical connection between components in the image forming apparatus 100. FIG. 3 is a perspective view of a drum cartridge 1.

The image forming apparatus 100 is an electro-photographic printer. The image forming apparatus 100 may be a laser printer or a light emitting diode (LED) printer, for example. As illustrated in FIG. 1, the image forming apparatus 100 includes a main body frame 101, a control circuit board 3, the drum cartridge 1, and a plurality of developing cartridges 2.

The main body frame 101 is a casing configured to accommodate the control circuit board 3, the drum cartridge 1, and the plurality of developing cartridges 2. The drum cartridge 1 attached with the plurality of developing cartridges 2 is mountable in the main body frame 101. The main body frame 101 includes a cover 101A capable of opening and closing an opening formed at the main body casing 101. The drum cartridge 1 attached with the plurality of developing cartridges 2 is mountable in the main body frame 101 when the cover 101A is open.

The plurality of developing cartridges 2 are attachable to the drum cartridge 1. The plurality of developing cartridges 2 store respective toner (developing agents) of colors such as cyan, magenta, yellow, and black. However, the plurality of developing cartridges 2 may store toner of the same color.

Each of the developing cartridges 2 includes a developing cartridge memory 21 and a developing roller 22. The developing cartridge memory 21 is a storage medium to which information can be written and from which information can be read. The information stored in the developing cartridge memory 21 includes, for example, at least one of the following pieces of information: toner color information; the total number of rotations by which the developing roller 22 has been rotated; the amount of toner that has been used; and an error history of the developing cartridge 2. Other information can be stored in the developing cartridge memory 21.

The drum cartridge 1 includes a plurality of slots 1A. Each of the plurality of developing cartridges 2 is attached to a corresponding one of the plurality of slots 1A. Although the number of the developing cartridges 2 and the number of slots 1A, are four according to this embodiment, the number of developing cartridges 2 and the number of slots 1A may be one, two, three, five or more. The drum cartridge 1 further includes a drum cartridge circuit board 11, a plurality of photosensitive drums 12, and a plurality of chargers 13.

When one of the developing cartridges 2 is attached to the drum cartridge 1, the developing cartridge memory 21 of the developing cartridge 2 is electrically connected to the drum cartridge circuit board 11, as shown in FIG. 2. The control circuit board 3 reads the information stored in the developing cartridge memory 21 through the drum cartridge circuit board 11. The control circuit board 3 also writes information to the developing cartridge memory 21 through the drum cartridge circuit board 11.

As illustrated in FIG. 2, the drum cartridge circuit board 11 includes a drum cartridge memory 111. The drum cartridge memory 111 is a storage medium, to which information can be written and from which information can be read. Information stored in the drum cartridge memory 111 includes information on the drum cartridge 1; and identification information of the image forming apparatus 100, in which the drum cartridge 1 is presently being mounted. The control circuit board 3 writes the identification information of the image forming apparatus 100 in the drum cartridge memory 111 when, for example, the circuit board 3 performs printing by using the drum cartridge 1. The information of the drum cartridge 1 stored in the drum cartridge memory 111 includes at least one of the following pieces of information: a manufacturing serial number of the drum cartridge 1; an identification code of the drum cartridge 1; information indicating models of image forming apparatuses to which the drum cartridge 1 is attachable; a specification of the drum cartridge 1; a service life of the photosensitive drums 12; charging characteristics of the photosensitive drums 12; information indicating whether the drum cartridge 1 is new; the total number of rotations by which the photosensitive drums 12 have been rotated; the total lengths of the charged times during which the photosensitive drums 12 have been charged; the total number of sheets that have been printed by the photosensitive drums 12; and an error history of the drum cartridge 1.

The main body frame 101 includes a connector 102 which is electrically connected to the drum cartridge circuit board 11 when the drum cartridge 1 attached with the developing cartridge 2 is mounted in the main body frame 101. The control circuit board 3 is electrically connected to the drum cartridge circuit board 11 through the connector 102. This allows the control circuit board 3 to write and read information to and from the drum cartridge memory 111.

Each of the photosensitive drums 12 is provided in the corresponding one of the slots 1A. The surface of each photosensitive drum 12 is in contact with the surface of a developing roller 22 of the corresponding developing cartridge 2 when the developing cartridge 2 is mounted in the corresponding slot 1A of the drum cartridge 1. The toner in each of the developing cartridges 2 is supplied to the surface of the corresponding photosensitive drum 12 through the corresponding developing roller 22. The photosensitive drum 12 transfers the toner supplied from the developing cartridge 2 to a sheet, that is, a recording medium.

Each of the chargers 13 is provided for the corresponding one of the photosensitive drums 12. Each charger 13 charges the surface of the corresponding one of the photosensitive drums 12. Each charger 13 is provided at a position at which the charger 13 can charge the surface of the corresponding photosensitive drum 12. As illustrated in FIG. 3, each charger 13 includes a wire 13A and a grid electrode 13B. The main body frame 101 includes a plurality of first terminals 103 in correspondence with the plurality of chargers 13 and a plurality of second terminal 104 also in correspondence with the plurality of chargers 13. For clarity purposes, FIG. 2 shows only one of the chargers 13, only one of the plurality of first terminals 103, and only one of the plurality of second terminals 104. When the drum cartridge 1 attached with the developing cartridges 2 is mounted in the main body frame 101, the wire 13A of each charger 13 is electrically connected to the corresponding first terminal 103, and the grid electrode 13B of each charger 13 is electrically connected to the corresponding second terminal 104. The control circuit board 3 applies a voltage to each charger 13 through the corresponding first terminal 103 and the corresponding second terminal 104.

When a predetermined amount of charge voltage is applied to the wire 13A of each charger 13, the wire 13A discharges, generating ions. The surface of the corresponding photosensitive drum 12 is charged by the ions uniformly and positively through the grid electrode 13B. At this time, the charge potential of the photosensitive drum 12 is controlled by adjusting an amount of the voltage applied to the grid electrode 13B. When an exposing unit, not illustrated, irradiates the surface of the charged photosensitive drum 12 with laser light or LED light, an electrostatic latent image is formed on the surface of the photosensitive drum 12. The toner carried on the surface of the developing roller 22 moves from the developing roller 22 to the photosensitive drum 12 according to the electrostatic latent image formed on the surface of the photosensitive drum 12. As a result, the electrostatic latent image is developed into a visible image on the surface of the photosensitive drum 12.

As illustrated in FIG. 3, the drum cartridge 1 include a plurality of cleaners 13C in correspondence with the plurality of chargers 13. Each cleaner 13C is configured to be slidingly moved on the wire 13A of the corresponding charger 13 while being in contact with the wire 13A so that the cleaner 13C removes dust from the wire 13A. The cleaner 13C may be moved manually or automatically. Hereinafter, the process of removing dust from the wire 13A by using the cleaner 13C will be referred to as a wire cleaning process.

As illustrated in FIG. 1, the control circuit board 3 includes a processor 31 and a control memory 32. The control circuit board 3 further includes: a plurality of voltage applying circuit boards 33, a plurality of detection circuit boards 34, and a plurality of feedback voltage detection circuits 35. The plurality of voltage applying circuit boards 33 are in correspondence with the plurality of chargers 13, respectively. The plurality of detection circuit board 34 are in correspondence with the plurality of chargers 13, respectively. The plurality of feedback voltage detection circuit 35 are in correspondence with the plurality of chargers 13, respectively. In FIG. 2, only one of the voltage applying circuit board 33, one of the detection circuit board 34, and one of the feedback voltage detection circuit 35 are illustrated. In FIG. 2, there are also shown electrical connection for one charger 13, that is: electrical connection between one charger 13 and the first and second terminals 103 and 104 for the charger 13; and electrical connection between the first and second terminals 103 and 104 for the charger 13 and the voltage applying circuit board 33, detection circuit board 34, and feedback voltage detection circuit 35 for the charger 13. Although not shown in the drawings, each of the other remaining chargers 13, each of the other remaining first terminals 103, each of the other remaining second terminals 104, each of the other remaining voltage applying circuits 33, each of the other remaining detection circuit boards 34, and each of the other remaining feedback voltage detection circuits 35 are electrically connected in the same manner as shown in FIG. 2. Although not shown in the drawings, the processor 31 is electrically connected with the control memory 32, the plurality of voltage applying circuit boards 33, the plurality of detection circuit boards 34, and the plurality of feedback voltage detection circuit 35.

The processor 31 is a central processing unit (CPU), for example. The processor 31 is a controller for controlling printing according to a program stored in the control memory 32. Specifically, the processor 31 executes various processes in the image forming apparatus 100 such as a discharge determination process, a writing process, a cleaning determination process (a simplified cleaning determination process and a detailed cleaning determination process), a reading process, and a setting process to be described later.

The control memory 32 is a storage medium which stores the program to be executed by the processor 31 and data required to execute the program. The information stored in the control memory 32 includes the identification information of the image forming apparatus 100.

The voltage applying circuit boards 33 are configured to apply voltages to the chargers 13 through the corresponding first terminals 103 and the corresponding second terminals 104. The voltage applying circuit boards 33 have the same configurations with one another. For example, each voltage applying circuit board 33 includes a transformer, and generates a pulse voltage to let the transformer induce a voltage. The voltage applying circuit board 33 applies the induced voltage, as the charge voltage, to the wire 13A of the corresponding charger 13 through the corresponding first terminal 103. When the charge voltage is applied to the wire 13A, current flows from the wire 13A to the grid electrode 13B. The current then flows through the second terminal 104 to the voltage applying circuit board 33. The voltage applying circuit board 33 adjusts the amount of the current by changing the resistance of a variable resistor (not shown) that is connected between the second terminal 104 and the ground. This allows the voltage applying circuit board 33 to adjust the voltage applied to the grid electrode 13B. During printing, the voltage applying circuit board 33 applies the charge voltage of a prescribed amount to the wire 13A of the corresponding charger 13. The charge voltage of the prescribed amount will be referred to as a printing charge voltage, hereinafter.

The detection circuit boards 34 are electrically connected with the first terminals 103, and are for detecting the discharge states of the respective chargers 13. The detection circuit boards 34 have the same configuration with one another. For example, each detection circuit board 34 includes, a coil (not shown) which is configured such that, when a current flows through an electric wiring connected between the corresponding first terminal 103 and the corresponding wire 13A, an induced current flows through the coil. Each detection circuit board 34 includes a current detector (not shown) for detecting the amount of the induced coil and generating an output current signal indicative of the amount of the induced current. By detecting the amount of the induced current, the detection circuit board 34 detects the amount of the current that flows through the wire 13A when the charge voltage is applied to the wire 13A from the voltage applying circuit board 33. The detection circuit board 34 supplies the processor 31 with an output current signal indicative of the amount of the induced current flowing through the coil in the detection circuit board 34.

It is noted that, when each charger 13 abnormally discharges, an overcurrent flows through the charger 13. Each detection circuit board 34 further includes a comparator (not shown) configured to compare the detected amount of the induced current flowing through the corresponding coil with a threshold current value. The comparator outputs a comparation result signal to the processor 31. When the detected amount of the induced current is greater than the threshold current and therefore the detected current is overcurrent, the detection circuit board 34 outputs an H level signal as the comparation result signal. In this way, the detection circuit board 34 detects the overcurrent that flows through the corresponding charger 13 when the abnormal discharge occurs in the charger 13. That is, the detection circuit board 34 detects the occurrence of the abnormal discharge. When the processor 31 receives the H level signal from the comparator in the detection circuit board 34 for one charger 13, the processor 31 detects occurrence of the abnormal discharge in the charger 13.

The threshold current value used by the comparator to detect the overcurrent has been set according to the characteristics of the corresponding charger 13. In the above description, the detection circuit board 34 has a hardware configuration to output the H level signal in response to detection of occurrence of the abnormal discharge. However, the detection circuit board 34 may have a software configuration to output the H level signal in response to detection of occurrence of the abnormal discharge.

The feedback voltage detection circuits 35 are for generating feedback voltages for the chargers 13 and supplying the feedback voltages to the processor 31. The feedback voltage detection circuits 35 have the same configuration with one another. Each feedback voltage detection circuit 35 has a voltage-dividing resistor circuit (not shown), which is shunt-connected between the corresponding first terminal 103 and the ground. The feedback voltage detection circuit 35 divides the charge voltage applied to the first terminal 103 to generate a feedback voltage signal, and supplies the feedback voltage signal to the processor 31.

2. Processes After Cover is Opened and Closed

Figure 4:
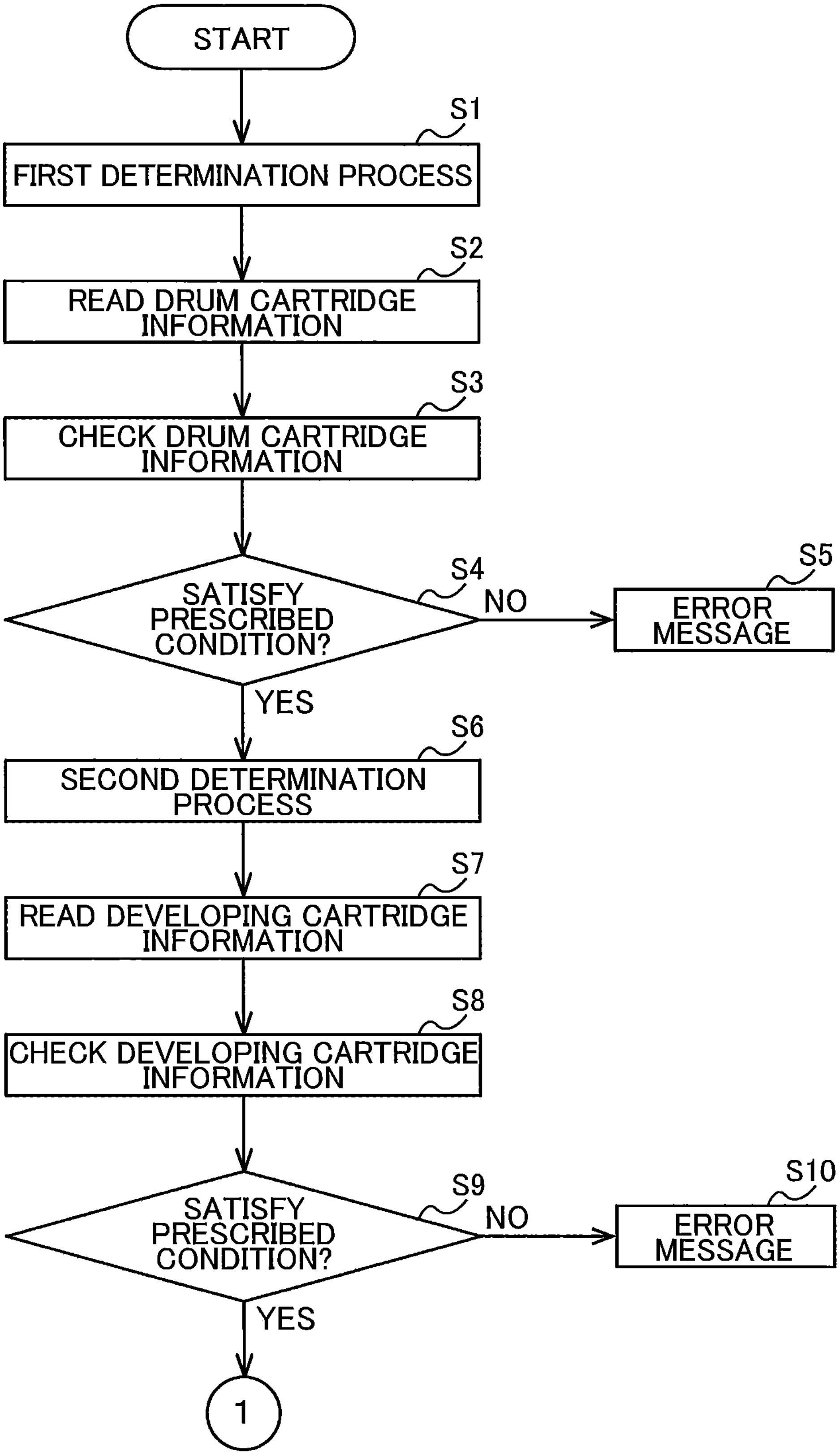
FIG. 4 is a flowchart illustrating steps in part of a process executed by a processor of the image forming apparatus according to the embodiment, the process being executed when a cover of the image forming apparatus is closed after being opened.
Figure 5:
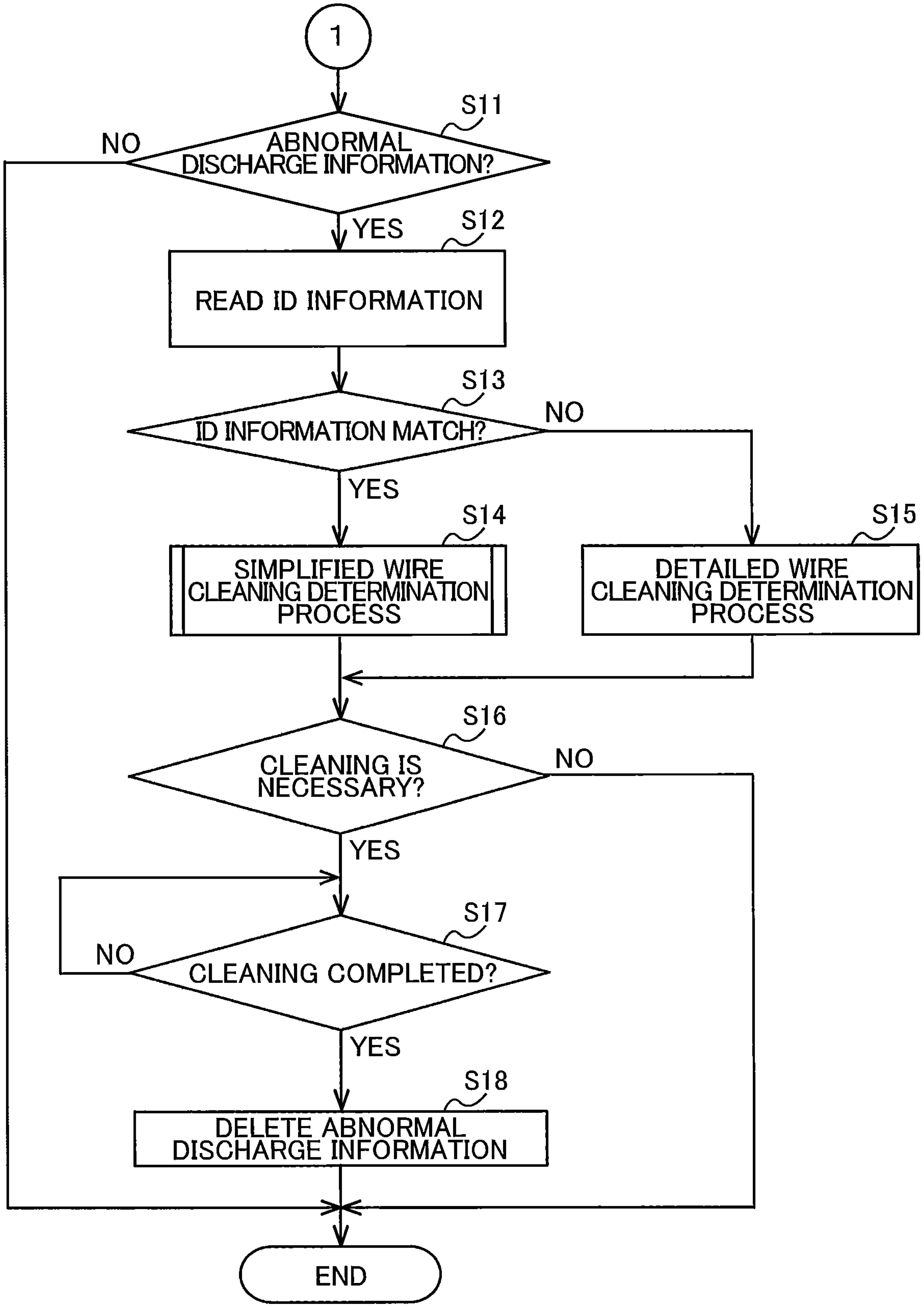
FIG. 5 is a flow chart illustrating steps in a remaining part of the process executed by the processor of the image forming apparatus according to the embodiment, when the cover is closed after being opened.

Next, description will be made with regard to processes executed by the processor 31 after the cover 101A is opened and closed. FIGS. 4 and 5 are flowcharts illustrating the flow of processes executed when the cover 101A is closed after being opened. When the cover 101A is closed after being opened, there is a possibility that the drum cartridge 1 may have been replaced. Therefore, the processor 31 executes the processes illustrated in FIGS. 4 and 5.

When the cover 101A of the main body frame 101 is closed after being opened in a state where the drum cartridge 1 is mounted in the main body frame 101, in S1 the processor 31 first executes a first determination process. In the first determination process, the processor 31 determines whether the processor 31 is capable of communicating with the drum cartridge memory 111, and performs authentication of the drum cartridge memory 111.

When the processor 31 determines that the processor 31 is capable of communicating with the drum cartridge memory 111 and the drum cartridge memory 111 is authenticated, in S2 the processor 31 executes a reading process to read the drum information stored in the drum cartridge memory 111.

The drum information read in S2 includes: the manufacturing serial number of the drum cartridge 1; an identification information of the drum cartridge 1; the information indicating models of image forming apparatuses to which the drum cartridge 1 is mountable; the specification of the drum cartridge 1; the service life of the photosensitive drums 12; the charging characteristics of the photosensitive drums 12; the information indicating whether the drum cartridge 1 is new; the total number of rotations by which the photosensitive drums 12 have been rotated; the total lengths of the charged times during which the photosensitive drums 12 have been charged; the total number of sheets that have been printed by the photosensitive drums 12; and an error history of the drum cartridge 1.

Then, in S3 the processor 31 checks the drum information read from the drum cartridge memory 111, and subsequently determines in S4 whether the drum information read from the drum cartridge memory 111 is normal. Specifically, the processor 31 determines whether the drum information read from the drum cartridge memory 111 satisfies a prescribed condition.

When the drum information read from the drum cartridge memory 111 does not satisfy the prescribed condition (S4: NO), the processor 31 determines that the read drum information is not normal. In this case, in S5 the processor 31 outputs an error. For example, the processor 31 reads drum error message information stored in the control memory 32, and displays an error message on a display (not illustrated) based on the read drum error message information.

On the other hand, when the drum information read from the drum cartridge memory 111 satisfies the prescribed condition (S4: YES), the processor 31 determines that the drum information is normal. In this case, the process proceeds to S6. It is noted that processes in S6 to S9 to be described below are executed for the developing cartridge memory 21 of each developing cartridge 2. So, in the following description for the processes of S6-S9, one of the developing cartridges 2 that is currently subjected to the process will be referred to as a target developing cartridge. In S6 the processor 31 executes a second determination process for the target developing cartridge 2. In the second determination process, the processor 31 determines whether the processor 31 is capable of communicating with the developing cartridge memory 21 of the target developing cartridge 2, and performs authentication of the developing cartridge memory 21 of the target developing cartridge 2.

When the processor 31 determines that the processor 31 is capable of communicating with the developing cartridge memory 21 of the target developing cartridge 2 and the developing cartridge memory 21 of the target developing cartridge 2 is successfully authenticated, in S7 the processor 31 executes a reading process for reading the developing-cartridge information stored in the developing cartridge memory 21. The developing-cartridge information read in S7 includes, for example, developing-cartridge identification information of the target developing cartridge 2. The developing-cartridge information read in S7 further includes at least one of: a manufacturing serial number of the target developing cartridge 2; information indicating models of the drum cartridges 1 to which the target developing cartridge 2 is mountable; specifications of the target developing cartridge 2, an amount of toner accommodated in the target developing cartridge 2; a service life of the target developing cartridge 2; information indicating whether the target developing cartridge 2 is new; the total number of rotations by which the developing roller 22 of the target developing cartridge 2 was rotated; the total number of sheets that were printed by the target developing cartridge 2; and an error history of the target developing cartridge 2.

In S8 the processor 31 checks the developing-cartridge information read from the developing cartridge memory 21 of the target developing cartridge 2, and in S9 determines whether the developing-cartridge information read from the developing cartridge memory 21 is normal. Specifically, the processor 31 determines whether the developing-cartridge information read from the developing cartridge memory 21 satisfies a prescribed condition.

When the developing-cartridge information read from at least one developing cartridge memory 21 does not satisfy the prescribed condition (S9: NO), the processor 31 determines that the developing-cartridge information of at least one developing cartridge 2 is not normal. In this case, in S10 the processor 31 outputs an error. Specifically, for example, the processor 31 reads developing-cartridge error message information stored in the control memory 32, and then displays an error message on the display (not illustrated) on a basis of the read developing-cartridge error message information.

On the other hand, when the developing-cartridge information read from all the developing cartridge memories 21 satisfies the prescribed condition (S9: YES), the processor 31 determines that the developing-cartridge information of all the developing cartridges 2 is normal. In this case, the processor 31 ends the processes illustrated in FIG. 4 and proceeds to S11 illustrated in FIG. 5. It is noted that the process of S11 to S18 to be described below are executed for each charger 13. So, in the following description for the processes of S11 to S18, one of the chargers 13 that is currently subjected to the process will be referred to as a target charger.

In S11, the processor 31 determines whether the drum information read from the drum cartridge memory 111 includes abnormal discharge information for the target charger 13, which indicates that abnormal discharge was occurred in the target charger 13 when the drum cartridge 1 was used at the latest. It is noted that as will be described later, when the abnormal discharge is occurred in some of the chargers 13, the abnormal discharge information for the charger 13 is written to the drum cartridge memory 111 together with the identification information of the image forming apparatus, in which the drum cartridge 1 is mounted at the time when the abnormal discharge is occurred in the charger 13 of the drum cartridge 1. When the cover 101A is closed after being opened, because there is a possibility that the drum cartridge 1 may have been replaced, the processor 31 determines whether the drum cartridge memory 111 of the presently-mounted drum cartridge 1 stores the abnormal discharge information for the target charger 13, thereby knowing whether abnormal discharge was occurred in the target charger 13 while the presently-mounted drum cartridge 1 was used at the latest.

When the processor 31 determines that the drum cartridge information does not include the abnormal discharge information for the target charger 13 (S11: NO), the processor 31 determines that the abnormal discharge was not occurred in the target charger 13 during the latest use of the presently-mounted drum cartridge 1. The processor 31 knows that it is unnecessary to execute the wire cleaning process to clean the wire 13A of the target charger 13. The processor 31 ends the process for the target charger 13.

On the other hand, when the processor 31 determines that the drum cartridge information includes the abnormal discharge information for the target charger 13 (S11: YES), the processor 31 determines that the abnormal discharge was occurred in the target charger 13 during the latest use of the presently-mounted drum cartridge 1. In this case, the processor 31 knows that it is necessary to execute the wire cleaning process to clean the wire 13A of the target charger 13 if the cleaning process has not yet been executed on the wire 13A. Therefore, the processor 31 first executes the cleaning determination process (simplified or detailed cleaning determination process) to be described later to determine whether the wire cleaning process for the wire 13A of the target charger 13 in the presently-mounted drum cartridge 1 was performed after occurrence of the abnormal discharge.

In S12, the processor 31 reads, from the control memory 32, the identification information of the image forming apparatus 100 stored in the control memory 32. In S13, the processor 31 determines whether the identification information read from the control memory 32 matches the identification information of the image forming apparatus 100 that is included together with the abnormal discharge information for the target charger 13 in the drum cartridge information read from the drum cartridge memory 111 in S2. The processor 31 thus determines whether the identification information matches, so that the processor 31 can determine whether the image forming apparatus 100 which is currently executing the cleaning determination process is identical to an image forming apparatus, in which the drum cartridge 1 was mounted when the abnormal discharge was occurred in the target charger 13.

When the processor 31 determines that the identification information matches (S13: YES), in S14 the processor 31 executes the simplified wire cleaning determination process.

On the other hand, when the processor 31 determines that the identification information does not match (S13: NO), in S15 the processor 31 executes the detailed wire cleaning determination process. Both the simplified wire cleaning determination process and the detailed wire cleaning determination process are to determine whether the wire cleaning process has already been executed on the target charger 13 after the abnormal discharge was occurred.

It is noted that the drum cartridge memory 111 of the drum cartridge 1 stores control information that was used for controlling the image forming apparatus in which the drum cartridge 1 was mounted when the abnormal discharge was occurred. For example, the control information includes a charge voltage Vchg and a grid voltage Vgrid that were applied respectively to the wire 13A and the grid electrode 13B of a charger 13 when the abnormal discharge was occurred in the charger 13. If the image forming apparatus 100 currently executing the cleaning determination process is identical to the image forming apparatus in which the drum cartridge 1 was mounted when the abnormal discharge was occurred in the target charger 13, the processor 31 can use the control information stored in the drum cartridge memory 111. Accordingly, the processor 31 executes the simplified wire cleaning determination process using the control information stored in the drum cartridge memory 111 of the drum cartridge 1.

Figure 6:
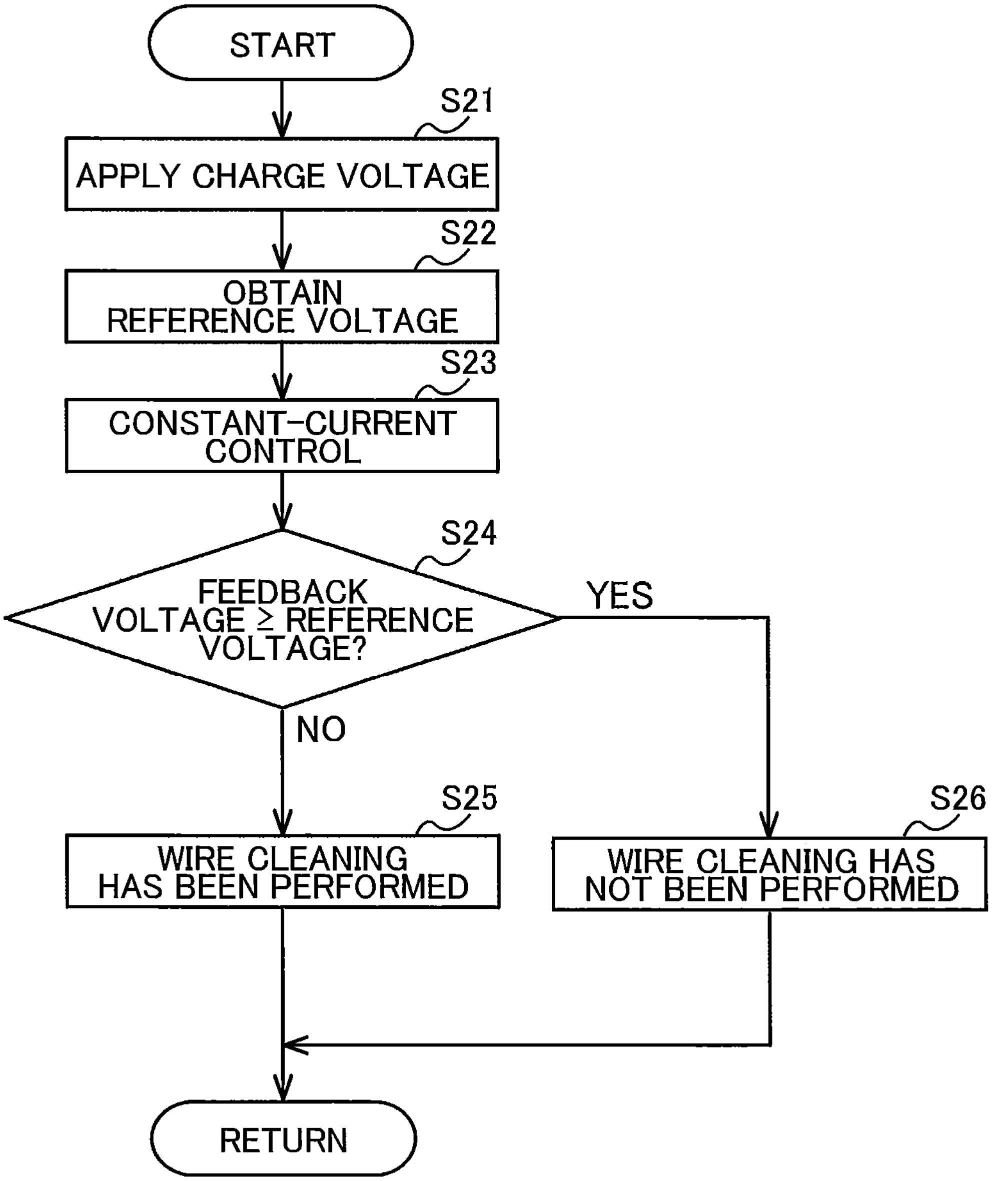
FIG. 6 is a flowchart illustrating steps in a simplified wire cleaning process in FIG. 5.

FIG. 6 is a flowchart of the simplified wire cleaning determination process.

In S21, the processor 31 controls driving of the voltage applying circuit board 33 for the target charger 13 to apply a charge voltage to the wire 13A of the target charger 13 through the first terminal 103. The charge voltage applied to the wire 13A at this time is lower than the charge voltage applied to the wire 13A during printing (printing charge voltage), in order to prevent abnormal discharge from occurring and an overcurrent from flowing through the target charger 13 even if the wire cleaning process was not performed on the wire 13A after occurrence of the abnormal discharge. For example, the amount of the charge voltage applied to the wire 13A during the simplified wire cleaning determination process may be approximately one-quarter of the charge voltage applied to the wire 13A during printing (printing charge voltage).

In S22, the processor 31 obtains a reference voltage for the target charger 13 stored in the drum cartridge memory 111. The manner of setting the reference voltage will be described later.

In S23, the processor 31 performs constant-current control on the current flowing through the wire 13A of the target charger 13 by controlling the voltage applying circuit board 33 for the target charger 13. More specifically, the processor 31 receives, from the detection circuit board 34 for the target charger 13, the output current signal indicative of the amount of the induced current flowing through the coil in the detection circuit board 34, and controls the voltage applying circuit board 33 for the target charger 13 to apply the wire 13A of the target charger 13 with such an amount of the charge voltage that will maintain constant the amount of the induced current. While performing the constant-current control, the processor 31 controls the voltage applying circuit board 33 so that the amount of the induced current flowing through the coil in the detection circuit board 34 gradually increases toward a predetermined value. The predetermined value is, for example, equal to the above-described threshold current value that is used in the comparator to determine whether the overcurrent has occurred due to the abnormal discharge. The predetermined value has been appropriately set according to the characteristics of the target charger 13.

In S24, the processor 31 obtains the feedback voltage signal from the feedback voltage detection circuit 35 for the target charger 13. Each time the processor 31 controls the voltage applying circuit board 33 to increase the amount of the induced current in the detection circuit board 34 while performing the constant-current control on the current flowing through the wire 13A, the processor 31 determines whether the feedback voltage has reached the reference voltage. It is noted that when the wire 13A is adhered with dust, the resistance of the wire 13A is high. The processor 31 can therefore determine whether the resistance of the wire 13A is high, that is, whether the wire 13A is adhered with dust, based on the level of the feedback voltage that is obtained when the voltage applying circuit board 33 feeds the controlled amount of current to the wire 13A.

When the feedback voltage continues being less than the reference voltage even when the induced current in the detection circuit board 34 has increased to reach the predetermined value (S24: NO), the processor 31 determines that the resistance of the wire 13A is sufficiently low that an overcurrent will not flow through the target charger 13 even when the charge voltage for printing is applied to the wire 13A. In S25, therefore, the processor 31 determines that the wire 13A of the target charger 13 was cleaned after occurrence of the abnormal discharge. On the other hand, when the feedback voltage becomes greater than or equal to the reference voltage before the induced current in the detection circuit board 34 reaches the predetermined value (S24: YES), the processor 31 determines that the resistance of the wire 13A is high to such a degree that an overcurrent will flow through the charger 13 when the charge voltage for printing is applied to the wire 13A. In S26, therefore, the processor 31 determines that the wire 13A was not cleaned after occurrence of the abnormal discharge. That is, in S24 the voltage applying circuit board 33 applies the charging voltage having such an amount that allows the feedback voltage to have an amount lower than a reference voltage when cleaning of the wire 13A was performed after occurrence of the abnormal discharge. If the feedback voltage becomes higher than or equal to the reference voltage in spite of the application of such a low amount of the charging voltage, the processor 31 knows that the wire 13A was not cleaned after occurrence of the abnormal discharge. It is noted that the processor 31 may repeat the process in S24 multiple times, while the induced current in the detection circuit board 34 is maintained at a single level. In this case, the processor 31 may determine that the wire 13A was not cleaned after occurrence of the abnormal discharge, only when the feedback voltage becomes greater than or equal to the reference voltage multiple times. Repeating the process multiple times improves the accuracy of the determination.

In S15, the processor 31 executes the detailed wire cleaning determination process. In the detailed wire cleaning determination process, the processor 31 is unable to use the control information stored in the drum cartridge memory 111 because the image forming apparatus 100 currently executing the cleaning determination process is different from the image forming apparatus in which the drum cartridge 1 was mounted when the abnormal discharge was occurred in the target charger 13. Therefore, in the detailed wire cleaning determination process, the processor 31 repeatedly performs the process of S24 to determine whether the feedback voltage becomes greater than or equal to the reference voltage, while changing the reference voltage. In this way, according to the simplified wire cleaning determination process or the detailed wire cleaning determination process, the processor 31 is able to determine whether the wire cleaning process was executed after occurrence of the abnormal discharge. It is noted that the reference voltage is a variable value in the detailed wire cleaning determination process. On the other hand, the reference voltage is a fixed value in the simplified wire cleaning determination process. Accordingly, it takes a shorter time to complete the simplified wire cleaning determination process than to complete the detailed wire cleaning determination process. When the identification information of the image forming apparatus 100 matches, therefore, by executing the simplified wire cleaning determination process, it is possible to reduce the length of time required before starting the printing process.

In S16, the processor 31 determines whether it is necessary to clean the wire 13A of the target charger 13 by using the corresponding cleaner 13C. The processor 31 determines that the wire cleaning process needs to be executed (S16: YES) when the processor 31 determines through the simplified or detailed cleaning determination process that the wire cleaning process was not executed after occurrence of the abnormal discharge. At this time, the processor 31 may prompt a user to execute the wire cleaning process on the target charger 13 using a display or a speaker, not illustrated. In S17, the processor 31 determines whether cleaning of the wire 13A of the target charger 13 by using the cleaner 13C has been finished.

When the processor 31 determines that cleaning of the wire 13A has not yet been finished (S17: NO), the processor 31 repeats the process in S17 until cleaning of the wire 13A has been finished. When the processor 31 determines that cleaning of the wire 13A has been finished (S17: YES), in S18 the processor 31 deletes the abnormal discharge information for the target charger 13 from the drum cartridge memory 111.

When in S16 the processor 31 determines that the wire cleaning process was executed after occurrence of the abnormal discharge, the processor 31 determines that the wire cleaning process is not necessary (S16: NO). In this case, the processor 31 ends the process for the target charger 13. When the processor 31 ends the processes of FIG. 5 for all the chargers 13, the image forming apparatus 100 becomes ready to start the printing process.

3. Process for Detecting Occurrence of Abnormal Discharge

Figure 7:
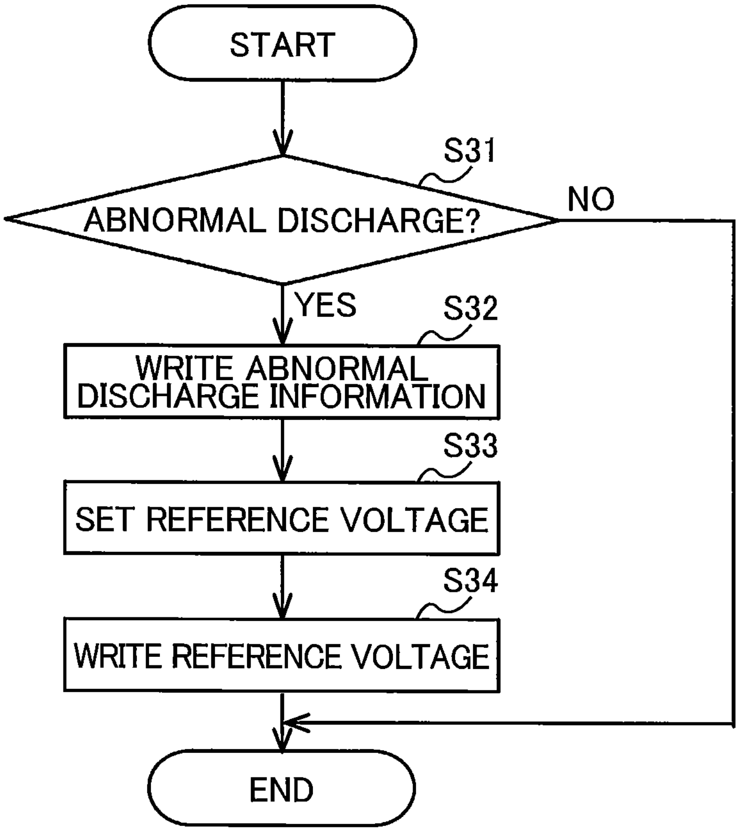
FIG. 7 is a flowchart illustrating steps in a process executed by the processor of the image forming apparatus according to the embodiment to detect whether an abnormal discharge has occurred.

Next, description will be made with regard to a process for detecting occurrence of abnormal discharge in each charger 13. FIG. 7 is a flowchart illustrating the process for detecting occurrence of the abnormal discharge. The process of FIG. 7 is executed for each charger 13. The process of FIG. 7 is performed repeatedly while the image forming apparatus 100 is performing printing. In the following description for the processes of S31-S34, one of the chargers 13 that is currently subjected to the process will be referred to as a target charger.

In S31, the processor 31 executes the abnormal discharge determination process to determine whether abnormal discharge occurs in the target charger 13. In the discharge determination process, the processor 31 determines whether the abnormal discharge occurs based on whether the processor 31 receives the H level signal from the detection circuit board 34 for the target charger 13. As described already, the detection circuit board 34 detects the amount of the induced current flowing through the coil while the printing charge voltage is applied to the wire 13A by the voltage applying circuit board 33. When the amount of the detected current (induced current in the coil) is greater than or equal to the threshold current value, the detection circuit board 34 determines that the overcurrent flows through the target charger 13 due to the abnormal discharge. In this case, the comparator in the detection circuit board 34 outputs the H level signal indicating that the abnormal discharge is detected. The processor 31 determines that abnormal discharge occurs in the target charger 13 depending on whether the processor 31 receives the H level signal from the detection circuit board 34 for the target charger 13.

When the processor 31 determines that abnormal discharge does not occur in the target charger 13 (S31: NO), the processor 31 ends the process. On the other hand, when the processor 31 determines that abnormal discharge occurs in the target charger 13 (S31: YES), in S32 the processor 31 executes the writing process to write the abnormal discharge information for the target charger 13 and identification information of the image forming apparatus, in which the drum cartridge 1 is currently mounted, to the drum cartridge memory 111.

In S33, the processor 31 executes the setting process to set the reference voltage for the target charger 13. In the setting process, the processor 31 sets the reference voltage for the target charger 13 using the charge voltage Vchg, the grid voltage Vgrid, and the following predetermined derivation formula: Vchg−(Vgrid−V1)×N−V2 wherein the charge voltage Vchg is the voltage that was applied to the wire 13A of the target charger 13 when abnormal discharge was occurred in the target charger 13, the voltage Vgrid is the voltage that was applied to the grid electrode 13B of the target charger 13 when the abnormal discharge was occurred in the target charger 13, and V1, N, and V2 in the derivation formula are numerical values set according to parameters, such as the charge voltage applied to the target charger 13 during printing.

In S34, the processor 31 writes the set reference voltage, the charge voltage Vchg, and the voltage Vgrid for the target charger 13 to the drum cartridge memory 111. Then, the processor 31 ends the process for the target charger 13.

As described above, in the case where the abnormal discharge information is stored in the drum cartridge memory 111 of the drum cartridge 1 mounted in the image forming apparatus 100, the processor 31 knows that abnormal discharge was occurred in the drum cartridge 1 when the drum cartridge 1 was used last time, even though the drum cartridge 1 was mounted to an image forming apparatus different from the image forming apparatus 100 when the drum cartridge 1 was used last time. When the processor 31 knows that abnormal discharge was occurred in the drum cartridge 1, the processor 31 can determine, before starting printing process, whether the wire cleaning process was executed on the drum cartridge 1 after occurrence of the abnormal discharge. That is, the processor 31 can determine whether it is necessary to perform wire cleaning before starting printing process. This prevents the photosensitive drum 12 from being deteriorated due to abnormal discharge.

4. Modifications

While the description has been made with reference to the embodiment, the configuration of the apparatus and/or the content of the processing can be appropriately changed.

In the process illustrated in FIG. 7, the processor 31 determines the reference voltage based on the charge voltage Vchg and the grid voltage Vgrid and stores the reference voltage in the drum cartridge memory 111. Alternatively, the processor 31 may store, in the drum cartridge memory 111, the charge voltage Vchg and the grid voltage Vgrid but not the reference voltage. In this case, in the simplified wire cleaning determination process, the processor 31 reads the charge voltage Vchg and the grid voltage Vgrid from the drum cartridge memory 111 and calculates the reference voltage from the read charge voltage Vchg and voltage Vgrid.

The predetermined derivation formula for deriving the reference voltage is not limited to the above described formula and can be appropriately changed.

The components appearing in the above embodiment and modifications may be appropriately combined within a range in which inconsistency does not occur.

In the above description, the plurality of voltage applying circuit boards 33 are provided in correspondence with the plurality of chargers 13, respectively. However, the voltage applying circuit boards 33 may be integrated together into a single circuit board. In the above description, the plurality of detection circuit boards 34 are provided in correspondence with the plurality of chargers 13, respectively. However, the detection circuit boards 34 may be integrated together into a single circuit board. In the above description, the plurality of feedback voltage detection circuits 35 are provided in correspondence with the plurality of chargers 13, respectively. However, the feedback voltage detection circuits 35 may be integrated together into a single circuit board.

What is claimed is:

1. An image forming apparatus comprising:
- a developing cartridge comprising a developing roller;
- a drum cartridge for use with the developing cartridge, the drum cartridge comprising:
  - a photosensitive drum;
  - a drum cartridge memory; and
  - a charger configured to charge the photosensitive drum;
- a casing to which the drum cartridge and the developing cartridge are attachable, wherein the drum cartridge with the photosensitive drum, the drum cartridge memory and the charger and the developing cartridge with the developing roller are separate cartridges, and each of the drum cartridge with the photosensitive drum, the drum cartridge memory and the charger and the developing cartridge with the developing roller is detachable from the casing;
- a connector configured to be electrically connected to the drum cartridge memory in a state where the drum cartridge is attached to the casing, information being writable to the drum cartridge memory through the connector; and
- a controller configured to control printing, the controller being configured to perform:
  - determining whether a state of the drum cartridge is abnormal; and
  - writing, in the drum cartridge memory, information representing occurrence of an abnormal state through the connector in a case where the occurrence of the abnormal state is determined.

2. The image forming apparatus according to claim 1, wherein the information representing the occurrence of the abnormal state includes identification information of the image forming apparatus to which the drum cartridge is attached when the occurrence of the abnormal state is determined.

3. The image forming apparatus according to claim 2, wherein the information representing the occurrence of the abnormal state further includes data of the charger which is used by the controller to control the charger when the occurrence of the abnormal state is determined.

4. The image forming apparatus according to claim 1, wherein the information representing the occurrence of the abnormal state includes data of the charger which is used to control the charger when the abnormal state of the drum cartridge occurs.

5. A method comprising:

determining, by an image forming apparatus, whether a state of a drum cartridge is abnormal, the image forming apparatus comprising a developing cartridge and the drum cartridge, the developing cartridge including a developing roller, the drum cartridge being for use with the developing cartridge, the drum cartridge including: a photosensitive drum; a charger configured to charge the photosensitive drum; and a drum cartridge memory, the drum cartridge with the photosensitive drum, the drum cartridge memory and the charger and the developing cartridge with the developing roller being separate cartridges, each of the drum cartridge with the photosensitive drum, the drum cartridge memory and the charger and the developing cartridge with the developing roller being detachable from the casing; and in a case where occurrence of an abnormal state is determined, writing, by the image forming apparatus, information representing the occurrence of the abnormal state in the drum cartridge memory.

6. The method according to claim 5, wherein the information representing the occurrence of the abnormal state includes identification information of the image forming apparatus to which the drum cartridge is attached when the occurrence of the abnormal state is determined.

7. The method according to claim 6, wherein the information representing the occurrence of the abnormal state further includes data of the charger which is used by the image forming apparatus to control the charger when the occurrence of the abnormal state is determined.

8. The method according to claim 5, wherein the information representing the occurrence of the abnormal state includes data of the charger which is used to control the charger when the abnormal state of the drum cartridge occurs.

* * * * *